Figure 1:
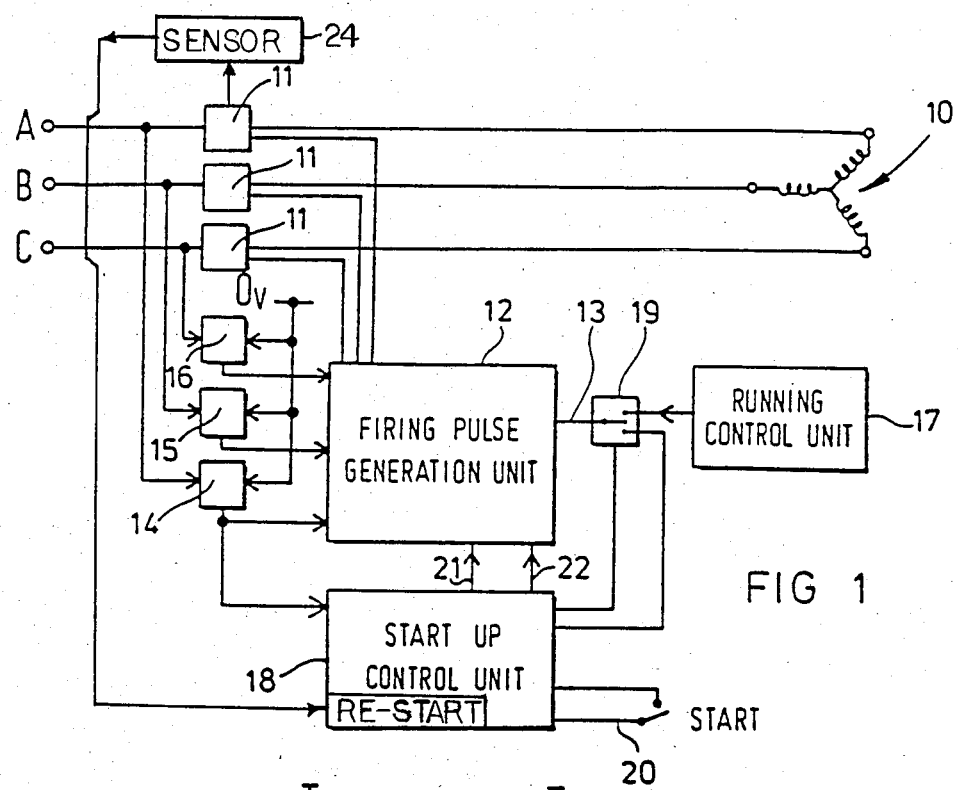

United States Patent [19]

Bristow et al.

[11] Patent Number: 4,628,241

[45] Date of Patent: Dec. 9, 1986

[54] START-UP CONTROL METHOD AND APPARATUS FOR POLYPHAE INDUCTION MOTOR

[75] Inventors: Raymond E. Bristow, South Brent; Michael Fitzpatrick, Yealmpton; David C. Groom, Harbertonford, all of England

[73] Assignee: Fairford Electronics Limited, Devon, England

[21] Appl. No.: 678,566

[22] PCT Filed: Apr. 4, 1984

[86] PCT No.: PCT/GB84/00118

§ 371 Date: Dec. 3, 1984

§ 102(e) Date: Dec. 3, 1984

[87] PCT Pub. No.: WO84/04005

PCT Pub. Date: Oct. 11, 1984

[30] Foreign Application Priority Data

Apr. 5, 1983 [GB] United Kingdom ............... 8309226

[51] Int. Cl.⁴ ............................................ H02P 5/40
[52] U.S. Cl. .................................. 318/778; 318/779; 318/729
[58] Field of Search ............... 318/778, 779, 808, 809, 318/729; 323/908, 910, 238

[56] References Cited

U.S. PATENT DOCUMENTS

| | | | |
|---|---|---|---|
| 3,363,143 | 1/1968 | Cavanaugh | 323/238 |
| 4,072,880 | 2/1978 | Oshima et al. | 318/778 |
| 4,468,603 | 8/1984 | Vandermeer et al. | 318/778 |
| 4,482,853 | 11/1984 | Bhausar | 318/778 |

FOREIGN PATENT DOCUMENTS 655856 7/1982 European Pat. Off. ............ 323/205

*Primary Examiner*—David Smith, Jr.
*Attorney, Agent, or Firm*—Cushman, Darby & Cushman

[57] ABSTRACT

In order to minimize the initial in-rush produced on first energisation of a polyphase induction motor (10), careful control is exercised over the firing of controlled switching means (11) connected in series with each of the supply phases (A, B, C) or motor windings. This control includes effecting an initial selective firing of the switching means (11) such as to cause current to flow between two only (B,C) of the supply phases, the firing being timed to occur such that the voltage between these two phases (B,C) is decreasing in value at the moment of firing. Thereafter, the switching means (11) are sequentially fired in a manner resulting in the progressive increase in the angle of conduction of each switching means (11).

9 Claims, 6 Drawing Figures

START-UP CONTROL METHOD AND APPARATUS FOR POLYPHAE INDUCTION MOTOR

The present invention relates to a method and apparatus for controlling the start-up of a polyphase a.c. induction motor.

The start-up of a polyphase induction motor can be most simply effected by connecting the motor directly to the supply phases. However, due to the low impedance of a non-rotating induction motor, a large current will flow initially until motor rotation is established whereupon the current drawn will decrease substantially. Since the large current surges caused by starting motors in this manner produce supply regulation problems, the supply authorities generally specify that these current surges be kept within certain limits (for example, three times rated load current) by some start-up control procedure.

One method of reducing the magnitude of the starting current to a polyphase induction motor is to initially apply only a fraction of the supply voltage to the motor and then progressively increase the applied voltage to the full supply level. This method is relatively easy to implement where voltage regulation merely reduces the magnitude of the voltage waveforms without changing their form (as, for example, in the case of transformer regulation). However, for reasons of economy and ease of control, nowadays the predominant method of effecting voltage regulation for motor control is by the use of controlled switching devices (thyristors, triacs) which interrupt the supply waveforms to produce a regulation of average applied voltage rather than instantaneous applied voltage. One problem of this is that it is difficult to prevent large in-rush currents upon initial motor energisation even when the average voltage applied to the motor is controlled to ramp up from a near zero value.

It is therefore an object of the present invention to provide a method and apparatus for starting a three phase induction motor by the controlled firing of switching devices, which serves to keep down the magnitude of current flowing during the start up period.

According to the present invention, there is provided a method of controlling the start up of a three phase a.c. induction motor by the controlled firing of respective switching means connected in series with each of the supply phases or motor windings, the switching means each being of the type which conduct from the moment of application of a firing pulse until current therethrough ceases, said method being characterised in that it comprises the steps of:

effecting an initial selective firing of the switching means to cause current to flow between two only of the supply phases, this firing being timed relative to a predetermined point on one of the phase voltage waveforms such that the voltage between said two phases is decreasing in value at the moment of firing, thereafter effecting sequential firing of the switching means such as to progressively increase the angle of conduction of each switching means from an initial minimum value.

The term "angle of conduction" or "conduction angle" as used herein refers, of course, to the conduction period of a switching means and is not to be confused with the angle at which conduction is initiated relative to some reference point of the corresponding supply-phase cycle.

It will be appreciated that by controlling the precise moment of initial firing it is possible to limit the in-rush current to a minimum adequate to magnetise the motor.

The method of invention is applicable both to arrangements where the switching means are in series with respective windings of a delta-connected motor and to arrangements where the switching means are connected in series with the supply phases. In the former case, the initial firing step only involves firing one switching means whereas in the latter case, two switching means must be fired.

Preferably, the said initial firing is effected at a point in time which is in advance of the moment when the voltage between said two phases becomes zero, by an interval corresponding to 45° to 55° of the supply waveform.

Of course, the said predetermined point on one of the supply voltage waveforms relative to which the initial firing is timed will not generally be the cross over point of the phase voltages of the said two phases. Conveniently, the said predetermined point is a zero voltage crossing of the phase voltage of the phase in which current is not caused to flow by the initial firing; relative to this zero crossing, the preferred timing of initial firing lies within a delay of 35° to 45° of the supply waveform.

Advantageously, the first firing of a said switching means during said sequential firing takes place with a delay corresponding to 50° to 60° of the supply waveform relative to said initial firing. This delay can be timed either directly from the initial firing moment or from the said predetermined point on one of the phase voltage waveforms.

After the initiation of sequential firing, the switching means are fired such that their conduction period progressively increases from an initial minimum. In the more common arrangement where the switching means are connected in series with the supply phases and are fired individually, this minimum conduction angle must generally be sufficient to prevent simultaneously non-conduction of all three switching means (the theoretical value of this minimum conduction period being 120° per half cycle of the supply). Of course, the end of the conduction period of a switching means is dependent on the motor characteristics and is not susceptible to precise control. As a result, if timing of the firing of a switching means is effected relative to the voltage zero crossings of the corresponding supply waveform, although the moment of firing will be accurately known, there will inevitably be some uncertainty as to the duration of the resulting period of conduction. There is therefore a risk that the theoretical minimum conduction period of 120° might not be achieved during the first few sequential firings of the switching means and accordingly a higher minimum value of say 130° must be aimed for to give a margin for error.

An alternative to timing firing from the voltage zero crossings, is to time the period of non-conduction of the switching means starting from the end of the last conduction period, and to fire the switching means at the end of the maximum permissible non-conduction period (i.e. in theory 60°). Again some margin for error (for example due to imbalance between motor phases) should be allowed and typically a maximum non-conduction period of 55° is taken. Of course, for the first firing of the switching means in the said third phase, there is no prior conduction-period end from which to time the non-conduction period; in this case, the moment of simultaneous firing of the two other phases is taken as the zero point for timing the period of non-conduction in the third phase.

Thus, in one implementation for controlling a motor through switching means connected into the supply phases, the switching means in two phases are initially simultaneously fired 40° after a voltage zero crossing in the third phase, the third phase being sequentially fired 55° later to start the sequential firing sequence. If for any reason, this firing timing should fail to prevent simultaneous non-conduction of all three switching meansn then the starting control unit is preferably arranged to re-initiate the starting procedure with reduced values for the timing delays previously set at 40° and 55°. These values can be reduced incrementally during successive start-up attempts until simultaneous non-conduction of all three switching means is avoided.

On the simultaneous firing sequence being successfully established, the conduction angle of the switching means is slowly increased as the motor runs up to speed (the reduced average magnitude of the voltage applied to the motor ensuring reduced current flow during the start-up period). Advantageously, the conduction angle of the switching means is increased to its maximum value and kept there for a predetermined period to ensure that the motor has started properly; generally speaking, however, the motor will have run up to speed even before the maximum conduction angle has been reached. The actual rate of increase in conduction angle has a significant effect on the current magnitude during start-up. Values of the time taken to increase the conduction of from ½ sec to 60 sec have been found suitable for most applications.

At the end of the start-up procedure, control of the motor can be effected, for example, with a view to maintaining a predetermined phase angle between voltage and current in each motor phase (such a control method is described, for example, in U.K. Pat. No. 1,551,644 and Application Nos. 2,084,359A and 2,084,360A).

According to a further aspect of the present invention, there is provided apparatus for controlling the start up of a three phase a.c. induction motor by the controlled firing of respective switching means connected in series with each of the supply phases or motor windings, the switching means each being of the type which conduct from the moment of application of a firing pulse until current therethrough ceases, said apparatus being characterised in that it comprises:

detector means couplable to the supply to detect a predetermined point on the voltage waveform of one supply phase, initial-firing control means for effecting an initial selective firing of the switching means to cause current to flow between two only of the three supply phases, the initial-firing control means being connected to said detector means to time said firing relative to said predetermined point on the voltage waveform of one supply phase such that the voltage between said two phases is decreasing in value at the moment of firing, sequential-firing control means responsive to operation of said initial-firing control means to thereafter effect sequential firing of the switching means such as to progressively increase the angle of conduction of each switching means from an initial minimum value.

Figure 2:
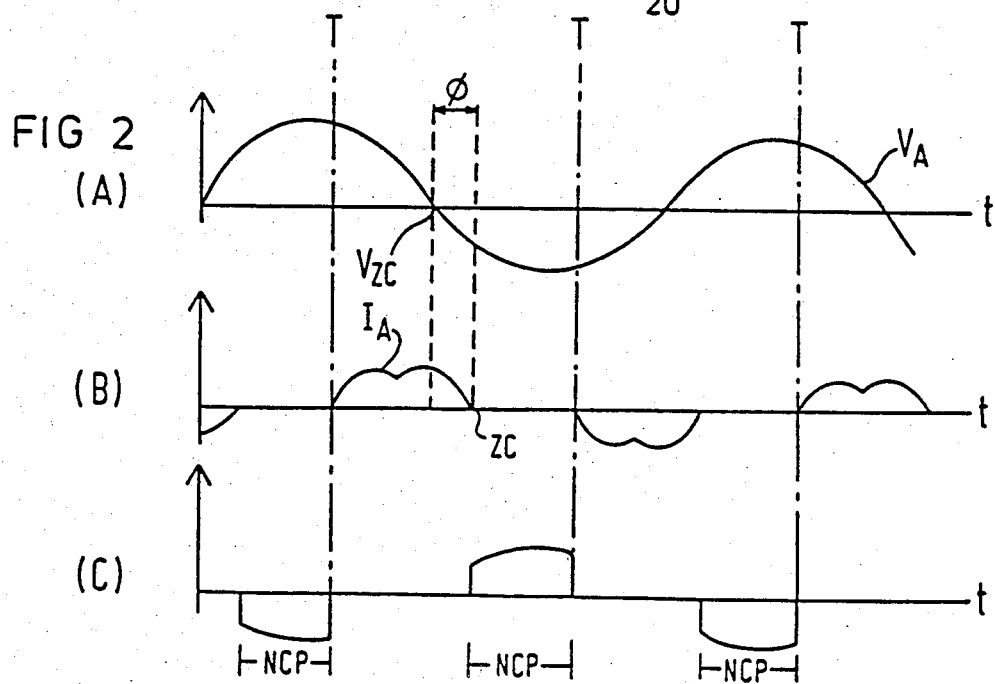
Figure 3:
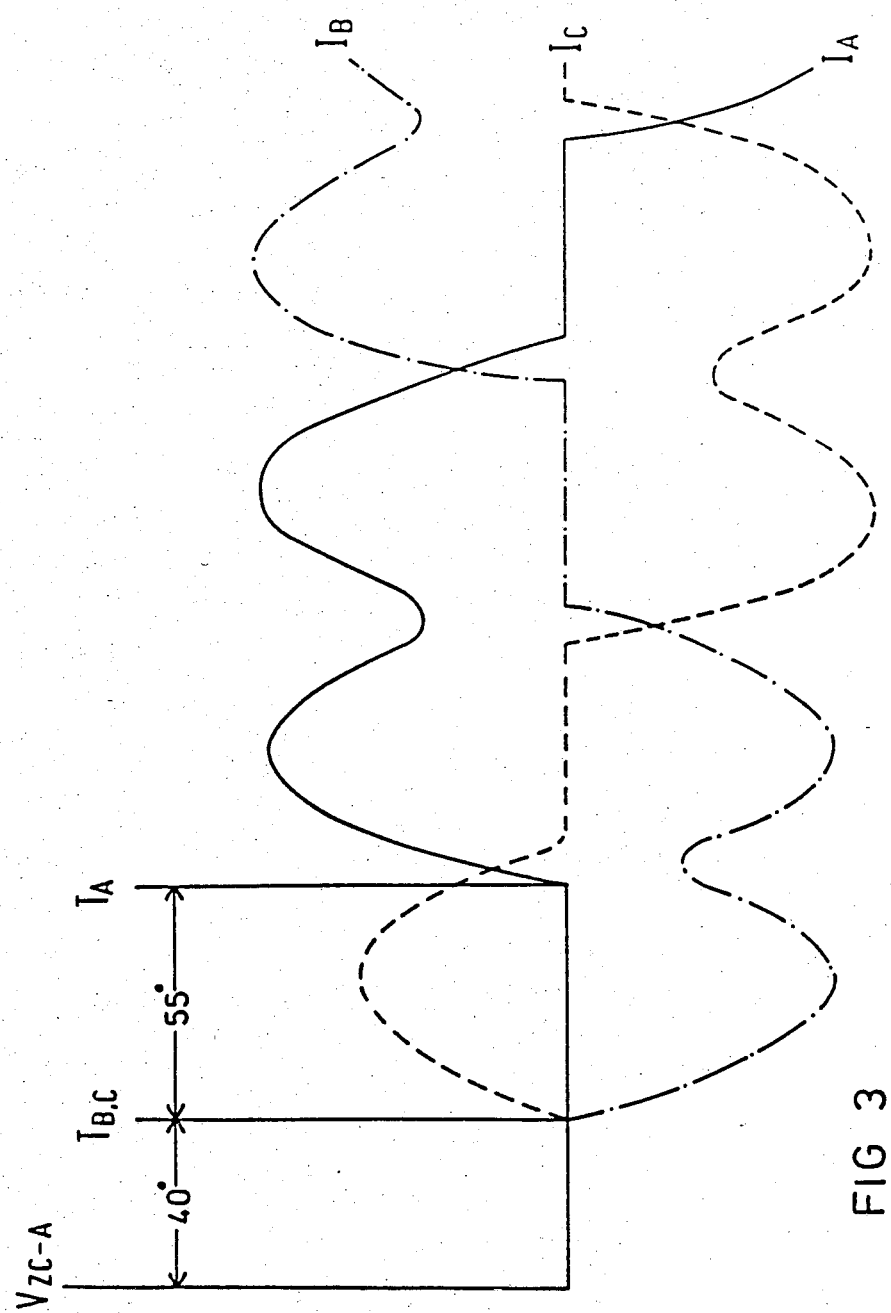
Figure 4:
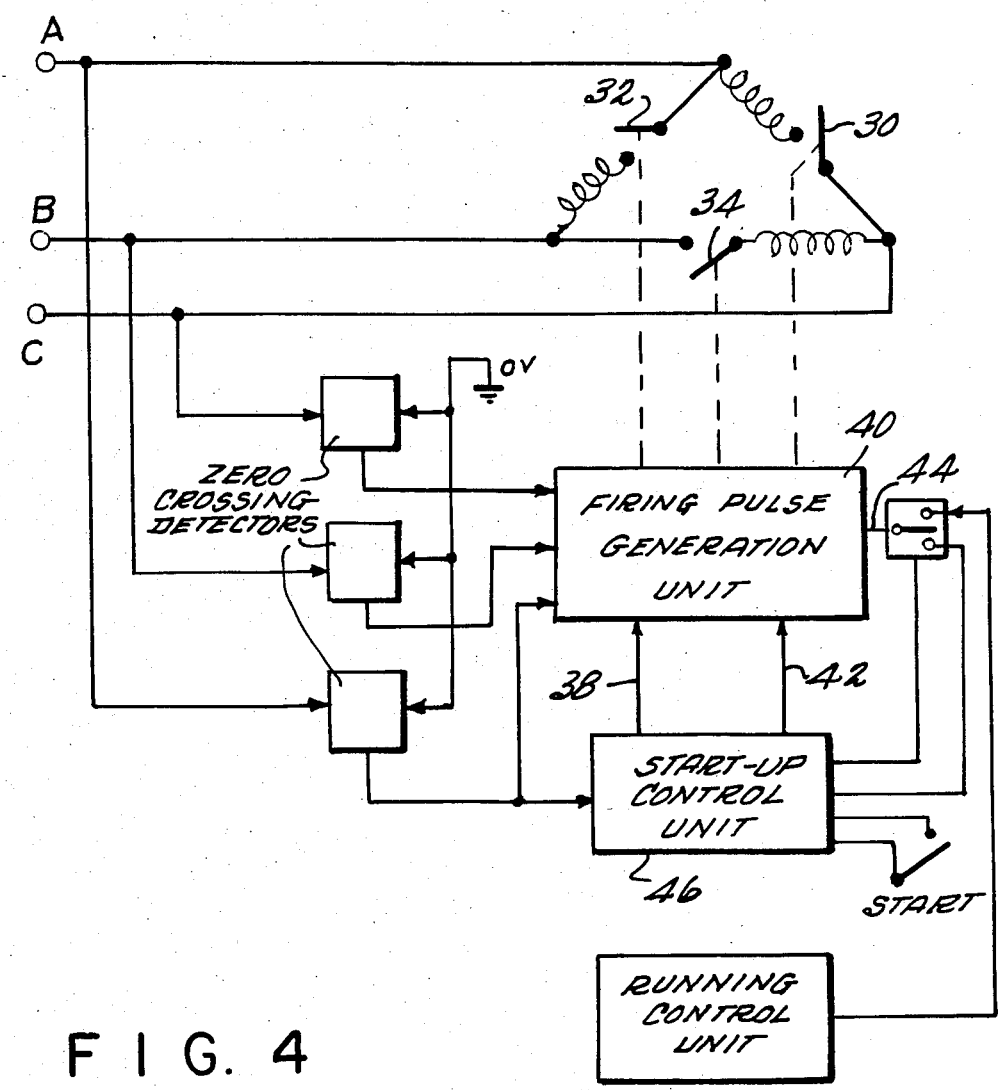

Various other novel aspects and features of the invention will become apparent from the following description, given by way of example, of a control system for a three-phase a.c. induction motor, reference being made to the accompanying diagrammatic drawings, in which:

FIG. 1 is a block diagram of the control system connected to control a three-phase induction motor, FIG. 2A shows a supply voltage waveform of phase A of the motor supply, FIG. 2B shows a typical current waveform for phase A during normal running of the motor, FIG. 2C shows the voltage waveform across a switching means inserted in supply phase A, and FIG. 3 is a current/time graph showing the currents flowing in all three supply phases during an initial start-up period, FIG. 4 is a block diagram of a second embodiment with a delta connected winding.

Shown in FIG. 1 is a three-phase induction motor 10 connected to supply phases A, B, C through respective switching means 11 inserted in each supply phase. The voltage waveform $V_A$ of supply phase A is shown in FIG. 2A.

The switching means 11 are of the type which conduct from the moment of application of a firing pulse until current therethrough ceases and are constituted, for example, by thyristor pairs or triacs. FIG. 2B illustrates the current $I_A$ flowing in phase A upon firing of the corresponding switching means at a time T and, as can be seen, there is a phase lag $\phi$ between the supply voltage $V_A$ dropping to zero and the return-to-zero of the current $I_A$.

The firing pulses for controlling the conduction of the switching means 11 are generated in dependence on a demand signal fed to an input 13 of the unit 12. The timing of the generation of the firing pulses can be carried out in known manner either relative to the voltage zero crossings $V_{ZC}$ of the supply phases A, B, C or relative to the return-to-zeros ZC of the phase currents. In FIG. 1, the firing-pulse generation unit 12 is shown as effecting timing relative to the voltage zero crossings as indicated by the output of zero-crossing detector units 14, 15 and 16 respectively sensing the voltages of phases A, B, C relative to neutral or ground voltage.

The magnitude (analogue or digital) of the demand signal fed to the firing-pulse generation unit 12 sets the duration of the interval between the detection of a voltage zero crossing $V_{ZC}$ in a phase of the supply and the firing of the corresponding switching means 11, the timing of this interval being effected in unit 12 by timing circuitry triggered by the signals produced by the detector units 14, 15, 16. The demand signal thus controls the duration of the period of conduction of each of the switching means 11.

When the firing-pulse generation unit 12 is to time the firing of the switching means 1 relative to the current return-to zero ZC in the corresponding phases, the detectors are arranged to sense these current return-to-zeroes (rather than voltage zero crossings) for example by monitoring the voltage across respective ones of the switching means. This voltage will be near zero when the switching means is conducting current but substantial when no current is flowing (see FIG. 2C which illustrates the voltage steps present during non-conducting periods NCP of the switching means).

The unit 12 may be analogue or digital in form and will not be described in detail herein since appropriate timing and pulse generation circuitry will be apparent to persons skilled in the art.

The generation of the demand signal fed to the input 13 is effected by a unit 17 during normal running of the motor 10; however, during start-up of the motor this signal is provided by a start-up control unit 18. An electronic switch 19 serves to determine which of the two units 17 and 18 provides the demand signal to the input 13 at any particular time. The operation of the switch 19 is controlled by the start-up control unit 18 such that for a predetermined time after a start button 20 is pressed, the input 13 of the unit 12 is fed with the demand signal coming form the control unit 18, whereas after the expiration of this predetermined time, the input 13 is fed with the demand signal from the running control unit 17.

The firing-pulse generation unit 12 is provided with second and third inputs 21 and 22 connected to the start-up control unit 18. The presence of a signal at the input 21 is effective to cause the simultaneous firing of the switching means 11 in phases B and C while the presence of a signal at the input 21 causes firing of the switching means in phase A.

The start-up control procedure effected by the unit 18 will now be considered.

The start-up control unit 18 is connected to the output of the detector 16 and receives therefrom a signal indicative of each zero crossing of the phase voltage $V_A$. Upon operation of the start button to start the motor 10, the unti 18 times a delay, equal to 40° of the supply voltage waveform, from the next-occurring phase A voltage zero crossing $V_{ZC-A}$ before outputting a signal on line 21 commanding the firing-pulse generation unit 12 to simultaneously fire the switching means in supply phases B, and C (at time $T_{BC}$ in FIG. 3). The timing of this delay can be implemented in any suitable manner, for example by counting a predetermined number of clock pulses.

The simultaneous firing of the switching means in phases B and C results in equal and opposite currents $I_B$ and $I_C$ flowing in these two phases (see FIG. 3). After an initial increase, the currents $I_B$ and $I_C$ start to decrease as the voltage difference between the supply phases B and C drops and reverses. Just prior to the currents $I_B$ and $I_C$ falling to zero, the unit 18 outputs a signal to input 22 of unit 12; as a result the switching means in phase A is fired (at time $T_A$ in FIG. 3) whereby conduction is sustained in phases B and A, (though, of course, the current $I_C$ continues to fall to zero turning the corresponding switching means off). The delay between the simultaneous firing of the switching means in phases B and C and the subsequent firing of the switching means in phase A is preferably 55°, this value having been chosen with a view to ensuring that, in most circumstances, the switching means in phase A is fired before current cessation in the other two phases (it being appreciated that if this were not done then the firing of the switching means in phase A would have no effect since current flow through the motor 10 always requires two switching means 11 to be on at the same time).

The firing delay values given above of 40° for initial firing and 55° for first sequential firing, can be varied, the preferred ranges being 35°–45° and 50° to 60° respectively. If the initial firing delay is decreased below 35° then the immediately resulting current will build up to a high value before falling whereas if the initial firing delay is increased much beyond 45°, it would be necessary to substantially reduce the delay for first sequential firing in order that this firing occurs while the switching means triggered by the initial firing are still conducting; reduction in the delay for first sequential firing result in a large current building up in the following conduction period.

After the first firing of the switching means 11 in phase A, the switching means are thereafter sequentially fired such as to progressively increase the conduction time of each switching means from the minimum necessary to sustain continuous current flow through the motor 10. As discussed earlier, the theoretical value of this minimum conduction time is 120° for every half cycle of the supply waveform but, in practice, a value of at least 125° should be taken to allow for imbalance in the motor. Thus, in the present embodiment, the start-up control unit 18, after first firing of the switching means in phase A, feeds a demand signal via the switch 19 to the firing-pulse generation unit 12 to cause the conduction period of each switching means to be progressively increased from an initial minimum value of 125°. (Where the firing-pulse generation unit times the firing of the switching means relative to phase current returns-to-zero, then the demand signal fed to the unit 12 directly sets the delay from the current return-to-zeroes to the firing points, this being equivalent to the non-conduction angle of the switching means; in this case, therefore, it is more accurate to talk of the non-conduction angle being decreased from an initial maximum of 55°).

The start-up control unit 18 continues to increase the conduction angle of each switching means to its maximum possible value over a predetermined period of time thereby providing a ramp increase of the average voltage applied to the motor 10. At the end of this ramping process, the start-up control unit 18 changes over the switch 19 to relinquish control of the unit 12 to the running control unit 17.

If, for any reason, the above-referred-to delay angles of 40° and 55° should fail to result in the switching means in phase A being fired before turn off of the switching means in the other two phases, then the start-up control unit 18 is preferably arranged to automatically re-initiate the starting procedure with reduced values of one or both of these delays, both reductions being effective to increase the likelihood of the phase A switching means being fired before non-conduction in the other two phases. Of course, in order to implement this automatic adjustment of the delay angles, it is necessary for the unit 18 to know that its initial starting attempt had failed; such information could be provided by a voltage sensor connected across the phase A switching means 11 and arranged to output a signal whenever the voltage across the switching means falls to zero (or near zero) for any substantial period such as when the switching means is conducting. In the absence of current flow in phase A, the voltage across the switching means would vary sinusoidally and therefore there would be no sustained voltage zeroes with the result that the sensor would not output a signal.

Where the start-up control unit 18 is intended to effect adjustment of the initial firing delays, then it is convenient to implement this unit using a microprocessor; in this case, the same microprocessor could be used to implement some of the functions of the unit 12 and, where appropriate, also of the unit 17.

The running control unit 17 can be constituted by a simple manual control for setting the magnitude of the demand signal to give a particular conduction angle, or by more complicated circuitry arranged to detect the phase lag φ between voltage and current and to so set the demand signal that the value of this phase lag is maintained equal to a predetermined value. Motor controllers arranged to operate in the latter manner are generally termed power factor controllers and examples may be found in U.K. Pat. No. 1,551,644 and U.K. Application Nos. 2,084,355; 2,084,359 and 2,084,360. In these patents and applications, various ways of measuring phase lag and of generating timing references for firing the switching means are proposed; thus, for example, in U.K. Pat. No. 1,551,644 the phase lag between current and voltage is measured in each phase of a polyphase supply and the firing of the switching means in each phase is timed relative to the voltage zero crossings in that phase. In contrast, U.K. Application No. 2,084,355 proposes phase lag measurement in one phase only and timing of the firing pulses relative to the current zeroes, again of one phase only.

The above-described motor control system can be adpated for use in arrangements where the motor windings are deltaconnected with these three switching means 30, 32 and 34 being in series with respective ones of the windings within the delta connection 36 as shown in FIG. 4. In this case, the occurrence of a signal on the line 38 after a 40° delay from a phase A voltage zero crossing is arranged to cause the firing pulse control unit 40 to fire the switching means 34 in the motor branch connected between phases B and C. The signal appearing in the line 42 after a further 55° delay is used to initiate sequential firing by triggering the switching means 32 in the motor branch connected between phases A and B (where phase B next follows A in the phase sequence). Thereafter, firing is controlled by the unit 40 in dependence in the demand signal fed to its input 44 by the start-up control unit 46, this firing being timed relative to the voltage zero crossings of the voltage across the winding branches or relative to the current return-to-zeroes of current flowing within these branches in a manner known per se. The firing of the switching means is less critical with the delta configuration since the conduction of each switching means is independent of the other switching means and does not need to be initiated prior to cessation of current flow through the latter means.

One problem with motor controllers implemented by using thyristors, triacs or similar switching means is the detection of short circuit failures of such switching means. In fact, the detection of such failures can be effected in a relatively straightforward manner by monitoring the voltages across the switching means since upon short circuit failure of a switching means, the cyclic generation of voltage steps thereacross (as illustrated in FIG. 2C) ceases. This condition can be detected, for example, by means of a sensor arranged to output a predetermined signal whenever the voltage across a switching means rises above a near-zero threshold value as can only happen when the switching means is non-conductive. Another method which would provide an indication of the failure of a switching means to turn off would be to generate pulses off the leading edges of the voltage steps occurring across the switching means during normal conduction; short circuit failure would prevent generation of such pulses.

A monitoring system for detecting the short circuit failure of any of the switching means 11 can therefore be implemented by providing a sensor 24 across each switching means means and connecting these sensors to a unit arranged to monitor the outputs of the sensors and to switch off the supply in the absence of output signals from any of these sensors. Only one such sensor is shown in FIG. 1 for convenience in illustrating. Preferably, rather than switching off the supply as soon as one output signal is missed from the sensors (which condition may result from electrical noise interrupting proper operation of the system) the output signals from these sensors are counted over a predetermined period (for example 1 second) and the supply switched off only if the resultant count value is less than, for example 60% of what it should be if all the switching means were functioning properly.

Since it is unlikely that all three switching means will fail at the same time, rather than having to time a predetermined count period, it is convenient to have the output signals of each sensor increment respective counters initially all set to the same value. Whenever one counter reaches a predetermined count, the other counters are checked to see if their counts are within acceptable limits of the said predetermined count. If there is agreement within the acceptable limits the counters are reset and the process repeated; otherwise the supply is cut off.

The output of the sensors need not be directly used to increment the counters. Thus, for example, the sensor outputs could be required to be present for the successful completion of the next firing pulse generation in the relevant phase; in this case, the counters can be arranged to be incremented from the firing pulses themselves.

A monitoring system implemented in the foregoing manner, would, of course, be able to detect the short-circuit failure of the switching means in one as well as both directions of conduction.

From the foregoing it can be seen that in another aspect, the present invention provides an arrangement for detecting the short circuit failure of a controlled switching device connected in the energisation circuit of an a.c. load, the switching device being of the type which conducts from the moment of application of a firing pulse until current therethrough ceases, said arrangement comprising sensor means responsive to the voltage difference across the switching device to generate an output signal indicative of the device being in, or having switched to, a non-conductive state, and monitor means responsive to a less than expected number (including one) of said output signals being produced by said sensor within a period of time, to generate an output indicative of the short circuit failure of the switching device.

Preferably said monitor means comprises counter means arranged directly or indirectly to count successive generations of said output signal over said period of time, and comparison means arranged to compare the count accummulated in the counter means over said period with a reference and to generate said output if this comparison indicates that said count is below a predetermined, acceptable limit relative to said reference.

In one embodiment, said period of time is of fixed duration and said reference is a count value set by the maximum possible number of sensor output signals that could in theory have been generated during said period. In another embodiment where a plurality of switching devices are used to control the energisation of the load and each device has an associated sensor and counter means, the counts held in each counter are compared with each other at the end of said period (as determined by, for example, any one of the counter becoming full).

We claim:

1. A method of controlling the start-up of a three phase a.c. induction motor (10) by the controlled firing of respective switching means (11) connected in series with each of the supply phases (A,B,C,) or motor windings, the switching means (11) each being of the type which conduct from the moment of application of a firing pulse until current therethrough ceases, said method comprising the steps of:

effecting an initial selective firing of the switching means (11) to cause current to flow between two only of the supply phases (B,C), this firing being timed relative to a predetermined point on one of the phase voltage waveforms ($V_A$) such that the voltage between said two phases (B,C) is decreasing in value at the moment of firing, effecting firing of the third-phase immediately before the current in the said two phases first falls to zero, and thereafter effecting sequential firing of the switching means (11) such as to progressively increase the angle of conduction of each switching means (11) from an initial minimum value.

2. A motor start up control method according to claim 1, for use where the windings of the motor (10) are delta connected and the switching means (11) are connected in series with the windings within the delta connection, wherein the said initial selective firing involves the firing of one only of the switching means.

3. A motor start-up control method according to claim 1, for use where the switching means (11) are connected in series with the supply phases (A, B,C), wherein the said initial selective firing involves the simultaneous firing of the switching means (11) in said two phases (B,C) only and the said sequential firing starts with the firing of the switching means (11) in the third phase (A), the said initial minimum value of the angle of conduction achieved during sequential firing, being sufficient to prevent simultaneous non-conduction in all switching means (11).

4. A motor start-up control method according to claim 3, wherein in the event that the first firing of the switching means (11) in the third phase (A) occurs after the cessation of conduction of the switching means (11) in the other two phases (B,C,) so that the conduction through the switching means (11) in the third phase (A) is not established, the start up control method is automatically restarted with the initial selective firing being effected earlier in time relative to said predetermined point and/or the first firing of the switching means (11) in the third phase (A) being effected sooner after said initial firing, the restarting of the start-up control method being repeated until conduction through the switching means (11) in the third phase (A) is established.

5. A motor start-up control method according to any one of claims 1 to 4, wherein said initial selective firing is effected at a point in time which is in advance of the moment when the voltage between said two phases (B,C) becomes zero, by an interval corresponding to 45° to 55° of the supply waveform.

6. A motor start-up control method according to claim 5, wherein the said predetermined point relative to which said initial selective firing is timed is the zero voltage crossing of the supply phase (A) other than said two phases (B,C).

7. A motor start-up control method according to claim 5, wherein the first firing of a said switching means (11) during said sequential firing, takes place with a delay corresponding to 50° to 60° of the supply waveform relative to said initial firing.

8. Apparatus for controlling the start-up of a three phase a.c. induction motor (10) by the controlled firing of respective switching means (11) connected in series with each of the supply phases (A,B,C) or motor windings, the switching means each being of the type which conduct from the moment of application of a firing pulse until current therethrough ceases, said apparatus comprising:

detector means (14) adapted to be coupled to the supply to detect a predetermined point on the voltage waveform of one supply phase (A), initial-firing control means (18) for effecting an initial selective firing of the switching means (11) to cause current to flow between two only (B,C) of the three supply phases, the initial firing control means (18) being connected to said detector means (14) to time said firing relative to said predetermined point on the voltage waveform of one supply phase (A) such that the voltage between said two phases (B,C) is decreasing in value at the moment of firing and effecting firing of the third phase immediately before the current in the said two phases falls to zero, sequential-firing control means (18,12) responsive to operation of said initial-firing control means (18) to thereafter effect sequential firing of the switching means (11) such as to progressively increase the angle of conduction of each switching means (11) from an initial minimum value.

9. Apparatus according to claim 8, further comprising an arrangement for detecting the short circuit failure of any one of said switching means, the arrangement including:

a respective sensor associated with each switching means and responsive to the voltage difference thereacross to generate an output signal indicative of the switching means being in, or having switched to, a non-conductive state, and monitor means responsive to a less than expected number of said output signals being produced by any one of said sensor within a period of time, to generate an output indicative of the short circuit failure of the associated switching means.

* * * * *